United States Patent
Kaplan et al.

(10) Patent No.: US 9,535,803 B2
(45) Date of Patent: Jan. 3, 2017

(54) MANAGING NETWORK FAILURE USING BACK-UP NETWORKS

(71) Applicant: Red Hat Israel, Ltd., Raanana (IL)

(72) Inventors: Alona Kaplan, Raanana (IL); Mike Kolesnik, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 128 days.

(21) Appl. No.: 14/628,830

(22) Filed: Feb. 23, 2015

(65) Prior Publication Data

US 2016/0246692 A1 Aug. 25, 2016

(51) Int. Cl.
| G06F 11/00 | (2006.01) |
| G06F 11/20 | (2006.01) |
| G06F 9/455 | (2006.01) |

(52) U.S. Cl.
CPC ....... *G06F 11/2007* (2013.01); *G06F 9/45558* (2013.01); *G06F 2009/45591* (2013.01); *G06F 2201/85* (2013.01)

(58) Field of Classification Search
CPC .............. G06F 9/45558; G06F 11/2007; G06F 2009/45591; G06F 2201/85
See application file for complete search history.

(56) References Cited

U.S. PATENT DOCUMENTS

| 7,606,141 | B2 | 10/2009 | Schimke et al. |
| 7,814,495 | B1* | 10/2010 | Lim .................... G06F 9/45558 717/168 |
| 8,224,957 | B2 | 7/2012 | Hansson et al. |
| 8,897,303 | B2 | 11/2014 | Xiong et al. |
| 2009/0157882 | A1 | 6/2009 | Kashyap |
| 2013/0124712 | A1 | 5/2013 | Parker |
| 2014/0173338 | A1 | 6/2014 | Arroyo et al. |
| 2014/0281701 | A1 | 9/2014 | Krishnasamy et al. |
| 2015/0095597 | A1* | 4/2015 | Ayanam ................. G06F 3/065 711/162 |
| 2015/0095908 | A1* | 4/2015 | Jacobs ................ G06F 9/45533 718/1 |

OTHER PUBLICATIONS

García, Álvaro López et al., "Virtualization and Network Mirroring to Deliver High Availability to Grid Services", Advanced Computing and e-Science Group, Instituto de Física de Cantabria, CSIC-UC, Spain.
"Ask a Networking Expert: What is an Overlay Network?", CohesiveFT Blog, Aug. 6, 2014.

* cited by examiner

*Primary Examiner* — Joshua P Lottich
(74) *Attorney, Agent, or Firm* — Lowenstein Sandler LLP

(57) ABSTRACT

A method for managing network failure identifying a plurality of hypervisors, each of the plurality of hypervisors being associated with a plurality of networks, and identifying a first network of the plurality of networks, wherein a first network role is assigned to the first network. The method further includes determining whether the plurality of hypervisors satisfies an unavailability condition, and, in response to determining that the plurality of hypervisors satisfies the unavailability condition, re-assigning the first network role of the first network to a back-up network.

20 Claims, 5 Drawing Sheets

200

| | Add Network | Remove Network | Manage Networks |
|---|---|---|---|
| | Name | Status | Role |
| △ | net1 | Operational | Migration Network |
| △ | net2 | Operational | Management Network; Display Network |
| △ | net3 | Operational | Back-Up Network |
| ▼ | net4 | Non-Operational | N/A |

Manage Networks

| Name | ☐ Assign All | ☐ Require All | Mgmt. Network | VM Network | Display Network | Migration Network | Back-Up Network |
|---|---|---|---|---|---|---|---|
| net1 | ☑ Assign | ☑ Required | ○ | VM | ○ | ● | ○ |
| net2 | ☑ Assign | ☑ Required | ● | VM | ● | ○ | ○ |
| net3 | ☑ Assign | ☐ Required | ○ | VM | ○ | ○ | ● |
| net4 | ☐ Assign | ☐ Required | ○ | VM | ○ | ○ | ○ |

208  256  258  260  262  264  268  270

[OK] [Cancel]

MANAGING NETWORK FAILURE USING BACK-UP NETWORKS

TECHNICAL FIELD

The embodiments of the disclosure relate generally to a networked environment and, more specifically, relate to managing network failure using back-up networks.

BACKGROUND

Virtual environments often utilize multiple networks that allow for the management of virtual machines run under hypervisors on host systems. For example, a migration network manages the migration of virtual machines from one host machine or hypervisor to another, while a display network controls the display of virtual machines on their respective host systems.

A network management server may utilize a management network to monitor the various virtual machines and hypervisors in the virtual environment. In the event of failure of the management network, the management server can no longer reach the hypervisors nor facilitate migration and display within the virtual environment. While such systems may perform failover management in the event of a network failure, they are often unable to differentiate between a failure of the network itself and a failure of one or more hypervisors of the network.

BRIEF DESCRIPTION OF THE DRAWINGS

The disclosure is understood more fully from the detailed description given below and from the accompanying drawings of various embodiments of the disclosure. The drawings, however, should not be taken to limit the disclosure to the specific embodiments, but are for explanation and understanding only.

FIG. 2A shows an illustrative graphical user interface for network management according to one embodiment of the disclosure;

FIG. 2B shows an illustrative graphical user interface including options for assigning roles to networks according to one embodiment of the disclosure;

DETAILED DESCRIPTION

Embodiments of the disclosure are directed to managing network failure using back-up networks. In particular, a network administrator may be provided with an interface to select a back-up network to use in case of failure of another network. He/she may specify the back-up network role on the cluster level just as he specifies the original role, for example, the management network. In some examples, if a management server of a system detects that a certain amount of hypervisors (above a pre-defined threshold) do not see the original network, the system would start using the back-up network to take over the network role of the original network. In the case of management network failure, for example, the system would start using the back-up network for communication with the hypervisors (since the original management network is unavailable). In the case of display network or migration network failure, the system may not be able to launch virtual machines and migration virtual machines, respectively. Once the original network is restored/available, the system would switch back to the original network. In some examples, the system may utilize other methods of determining whether a network has failed, such as whether the network is down for a pre-determined amount of time, whether the network availability has been unstable, or any other suitable method. In other examples, the system may automatically designate a network as a back-up network in addition to or in lieu of the network administrator.

A method of one embodiment includes identifying (e.g., by a processing device) a plurality of hypervisors, each of the plurality of hypervisors being associated with a plurality of networks. The method further includes identifying a first network of the plurality of networks, wherein a first network role is assigned to the first network. The method further includes determining (e.g., by the processing device) whether the plurality of hypervisors satisfies an unavailability condition, and, in response to determining that the plurality of hypervisors satisfies the unavailability condition, re-assigning the first network role of the first network to a back-up network. The back-up network is to communicatively couple each of the plurality of hypervisors in accordance with the first network role. Accordingly, aspects of the present disclosure provide for manual or automatic assignment of back-up networks for a networked environment, as well as for automatic detection of failure of a network and replacement by a back-up network to resume the role of the failed network, thus minimizing network downtime and maintaining optimal network performance.

Figure 1:
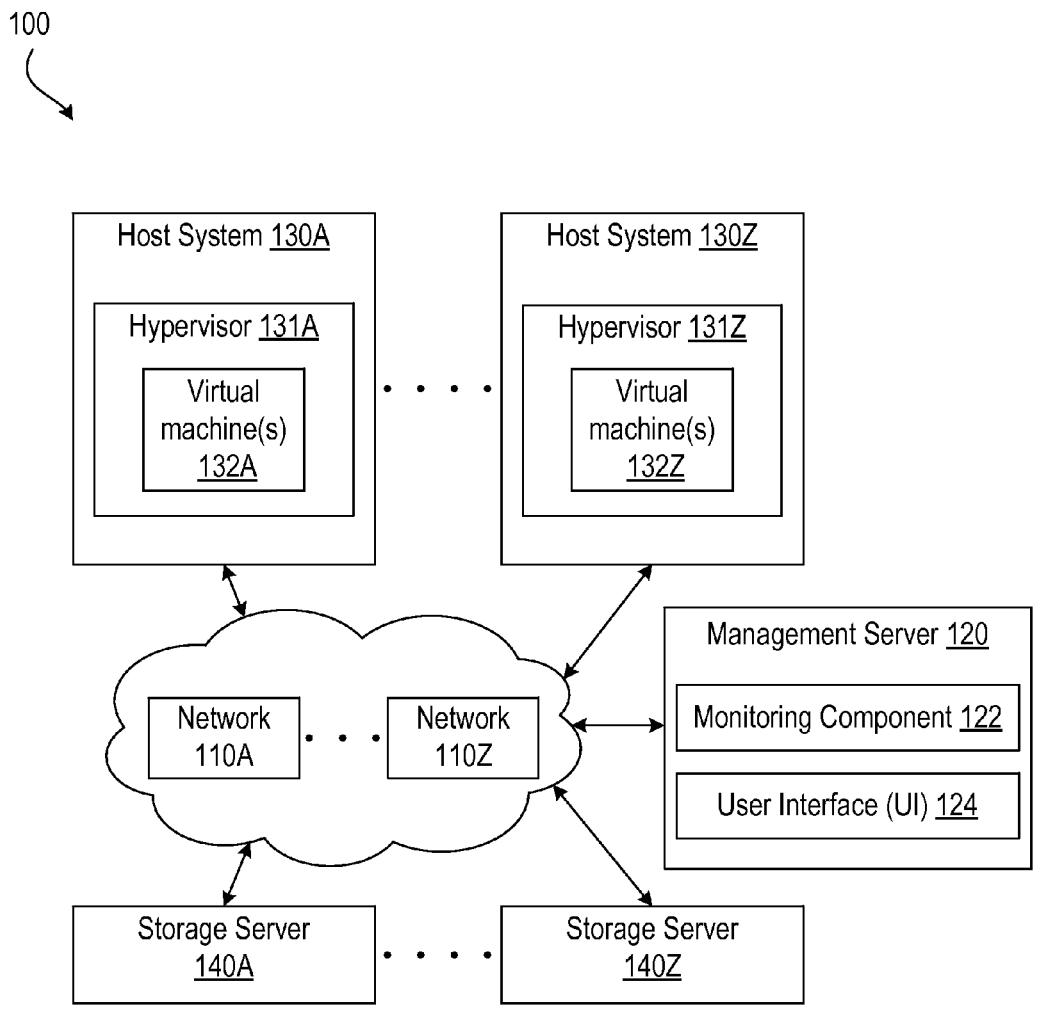
FIG. 1 is a block diagram of an exemplary system architecture in which the embodiments of the disclosure may operate.

FIG. 1 is a block diagram of an exemplary system architecture 100 in which the embodiments of the disclosure may operate. The system architecture 100 includes one or more host systems 130A-130Z, one or more storage servers 140A-140Z, and a management server 120 all coupled via one or more networks 110A-110Z.

The host systems 130A-130Z may each include a hypervisor (e.g., hypervisors 131A-131Z, respectively) that is each associated with one or more virtual machines (e.g., virtual machines 132A-132Z). The host systems 130A-130Z may include, but are not limited to, desktop computers, laptop computers, rackmount servers, routers, switches, tablet computers, mobile phones, or any other type of computing device. The host systems 130A-130Z may include hardware resources may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources may be used to execute software, including one or more operating systems, virtual machines (e.g., a virtual machine based on a mobile communications device), or other applications.

The hardware resources of a host system may provide one or more services such as, but not limited to, networking services, storage services, and software libraries. In some embodiments, one or more hypervisors (e.g., hypervisors 131A-131Z), also referred to as virtual machine monitors (VMMs), and one or more virtual machines (e.g., virtual machine 132A-132Z) may use the one or more services that are provided by the host system. The hypervisors 131A-131Z are applications that execute on respective host systems 130A-130Z to manage virtual machines 132A-132Z, respectively. Each hypervisor may manage one or more virtual machines at any given time (e.g., virtual machines 132A may correspond to three virtual machines, all managed by the hypervisor 131A). Each of the hypervisors 131A-131Z may instantiate or start, migrate, pause, or perform other types of events associated with the virtual machines 132A-132Z. For example, the hypervisor 131A may perform a live merge operation for a virtual disk used by one of the virtual machines 132A.

In one illustrative example, the hypervisor 131A may be a component of an operating system executed by the host system 130A. Alternatively, the hypervisor 131A may be provided by an application running under the operating system of the host system 130A, or may run directly on the host system 130A without an operating system beneath it. The hypervisor 131A may abstract the physical layer, including processors, memory, and I/O devices, and present this abstraction to virtual machines 132A as virtual devices.

In some embodiments, the hypervisors 131A-131Z may further coordinate metadata changes in the system architecture 100, such as creating and deleting virtual disk images, creating and merging snapshots, copying images between storage domains, creating templates and storage allocation for block devices of the hardware resources, such as hard drives or other storage devices. In some embodiments, each of the hypervisors 131A-131Z may update series of volumes identified in virtual disk image files that are stored at one or more of the storage servers 140A-140Z. In some embodiments, one or more of the hypervisors 131A-131Z may include virtualization API and multi-platform emulators. Each of the virtual machines 132A-132Z may execute guest operating systems that can be accessed by a client system over one or more of the networks 110A-110Z. Moreover, each of the virtual machines 132A-132Z may further run guest applications using their respective guest operating systems. In some embodiments, the virtual machines 132A-132Z may execute guest operating systems that utilize underlying virtual processors, virtual memory, and virtual I/O devices. One or more applications may be running on each of virtual machine 132A-132Z under the guest operating systems. In some embodiments, the operating systems may include Microsoft™, Linux™, Solaris™, Mac™ OS or any other suitable operating system.

The networks 110A-110Z may define a network cluster, and may include one or more public network (e.g., the Internet), private networks (e.g., a local area network (LAN) or wide area network (WAN)), or combinations thereof. The networks allow for bidirectional communication between any of the devices of the system architecture 100, and may include wired and/or wireless infrastructures. The wireless infrastructures may be provided by one or multiple wireless communications systems, such as wireless fidelity (WiFi) hotspots connected with the networks 110A-110Z and/or wireless carrier systems that can be implemented using various data processing equipment, communication towers, etc. In some embodiments, one or more of the networks 110A-110Z are under the control of the management server 120.

The networks 110A-110Z may provide varying levels of connectivity between the devices of the system architecture 100. The networks 110A-110Z may include, but are not limited to, one or more management networks (e.g., to allow the management server 120 to manage one or more of the hypervisors 131A-131Z), display networks (e.g., which facilitate launching of one or more of the virtual machines 132A-132Z), migration networks (e.g., which may be used to migrate virtual machines between one or more of the hypervisors 131A-131Z), and storage networks (e.g., for storing in and retrieving data from the storage servers 140A-140Z).

As illustrated in FIG. 1, the system architecture 100 further includes a management server 120. In some embodiments, the management server 120 may manage the utilization of the hardware resources of the host systems 130A-130Z via one or more of the networks 110A-110Z, as well as aspects of the storage servers 140A-140Z and their respective server storage devices 142A-142Z. The management server 120 may include a monitoring component 122 that is capable of assigning network roles to each of the networks 110A-110Z, monitoring activity of the networks 110A-110Z, and re-assigning network roles in the event of failure of one or more of the networks 110A-110Z. For example, the monitoring component 122 may allow the management server 120 to establish bidirectional communication between itself and one of the hypervisors 131A-131Z (e.g., to request a network ID, to determine if the hypervisor is operational, etc.). In some embodiments, the monitoring component 122 may be performed by one of the host systems 130A-130Z in addition to or in lieu of the management server 120. In some embodiments, less than all of the networks 110A-110Z are managed by the management server 120. For example, networks having specific network roles (e.g., a management network, a back-up network to the management network, etc.) are managed/monitored by the management server 120, while other networks having other network roles may be managed/monitored by one or more of the hypervisors 131A-131Z. The functionality of the monitoring component 122 is described in greater detail with respect to FIGS. 3 and 4.

In some embodiments, the management server 120 further includes a user interface (UI) 224, which allows a user (e.g., a network administrator) to manage the networks 110A-110Z. For example, the user may assign network roles to the various networks 110A-110Z using the UI 224, and the monitoring component 122 takes these assignments into account when managing failure of one or more of the networks 110A-110Z. An exemplary UI 224 is described below and illustrated in FIGS. 2A-2B.

In one embodiment, the storage servers 140A-140Z include one or more hardware or software devices, which may be located internally or externally to the storage servers 140A-140Z. Examples include, but are not limited to, random-access memory (RAM), non-volatile storage memory (e.g., flash memory, electrically erasable programmable read-only memory (EEPROM), solid state drives (SSD), etc.), magnetic storage memory (e.g., one or more hard drives), and optical memory (e.g., CDs, DVD, Blu-ray drives, etc.).

Reference is now made to FIG. 2A, which illustrates a GUI 200 for network management according to one embodiment of the disclosure. For example, the GUI may correspond to the user interface 124 of the management server 120, and may be utilized by a user (e.g., network administrator) of the management server 120. The GUI 200 includes network options 202 (e.g., an option to add a network, an option to remove a network, an option to manage networks, or other suitable options) and a list 204 of available networks. Operation indicators 206 may indicate whether each network of networks 208 is operational or non-operational. Status fields 210 may also indicate a status of each of the networks 208, which may provide more detailed information as to the network status than the operation indicators 206. For example, a given network may have a status such as "operational", "non-operational", "unreachable", "failed", "attempting contact", etc. Network roles 212 indicate respective network roles of each of the networks 208. Any of the of the elements of the GUI 200 may be updated in real-time.

As an example, "net1" is operational (e.g., is communicatively coupling one or more of a plurality of hypervisors and other devices, such as those in the system architecture 100), and has an assigned network role of "migration network". As another example, "net2" is operational and has two assigned network roles: "management network" and "display network". As another example, "net3" is operational and has an assigned network role of "back-up network". As another example, "net4" is non-operational (e.g., may have failed, is not assigned a network role, etc.) and does not have an assigned network role.

In some embodiments, the network assigned as the back-up network may not perform any network function until it is assigned a network role of another network in response to failure/unavailability of the other network. For example, if "net2" fails or otherwise becomes unavailable, one or more of the network roles of "net2" may be assigned to "net3" until "net2" becomes available once again (thus, "net3" will have two or three network roles: "back-up network" and "management network" and/or "display network"). In some embodiments, multiple networks may be assigned network roles of "back-up network" to handle the load of a failed network. For example, if "net4" is available and is also assigned a network role of "back-up network", then "net3" may be assigned the network role of "management network" and "net4" may be assigned the network role of "display network" if "net2" has failed or became unavailable. In some embodiments, the load may be distributed automatically (e.g., by the monitoring component 122), and additional networks may be assigned network roles of "back-up network" if the number of assigned back-up networks is unable to meet the demand of the failed/unavailable network. In some embodiments, if multiple back-up networks are designated, each back-up network may be ranked (e.g., by the monitoring component 122) according to a demand. For example, the highest ranked back-up network may correspond to a network having a least amount of demand. If the highest ranked back-up network fails or becomes unavailable, the next highest ranked back-up network may take over the network roles of the highest ranked back-up network. In some embodiments, a network to be designated as a back-up network may surrender its current network role to another network in order to be assigned as the back-up network.

In some embodiments, the network administrator may manually select which networks are to share the load of a particular network in the event that the particular network fails or becomes unavailable. FIG. 2B shows an illustrative GUI 250 including options for assigning roles to networks according to one embodiment of the disclosure. For example, GUI 250 is similar to GUI 200, but also includes network management window 252 (e.g., which may be displayed in response to a user selection of the option to manage networks from the network options 202). The network management window 252 includes a list of the networks 208, assignment options 256, requirement options 258, management network assignments 260, VM status 262 (which indicates which networks are associated with the display and migration of virtual machines), display network assignments 264, migration network assignments 268, and back-up network assignments 270. The network management window 252 further includes selectable buttons 272 and 274. For example, in response to a user selection of the button 272, changes made to any of the options in the network management window 252 will be saved and the network management window 252 will close. Alternatively, in response to a user selection of the button 274, no changes will be saved and the network management window 252 will close.

In one embodiment, the assignment options 256 are toggle options that the network administrator can use to determine which networks are to be assigned particular network roles. If a network is unassigned, the network may appear as "non-operational" (e.g., as shown in the GUI 200 for "net4").

In one embodiment, the requirement options 258 indicate which networks are associated with all of the hypervisors within a network cluster managed by the management server (e.g., all of the hypervisors 131A-131Z managed by the management server 120). For example, "net1" and "net2" are indicated as required, while "net3" is not indicated as required. If a network is not indicated as required, but is still indicated as a VM network (e.g., VM status 262), the network may still be used to carry VM traffic.

In one embodiment, the assignments 260, 264, 268, and 270 may be selected to assign each of the networks 208 respective network roles. For example, "net1" is assigned the network role of "migration network", "net2" is assigned the network roles of "management network" and "display network", and "net3" is assigned the network role of "back-up network". In one embodiment, two or more networks may have the same assigned network role (e.g., to distribute the network load) and each network may have multiple roles. In another embodiment, some networks may be assigned two or more network roles and some networks may have two or more assigned network roles, but some network roles may only be assigned to a single network at a given time (e.g., only one network may be assigned the network role of "management network"), and the single network may not have any other network roles. In other embodiments, each network role is only assigned to a single network, and no networks may be assigned the same network roles or multiple network roles.

In some embodiments, the network management window 252 may be used to manually select a back-up network for a specific network (e.g., "net2") or for a particular network role (e.g., "management network"). For example, "net3" may be selected to act as a back-up network to "net2", and "net3" may be assigned whatever network role was assigned to "net2" in response to a determination that "net2" has failed or is unavailable. As another example, "net3" may be selected to act as a back-up network to whatever network is assigned the network role of "management network", such that "net3" will be assigned the network role of "management network" if a network previously assigned the network role of "management network" has failed or is unavailable.

Figure 3:
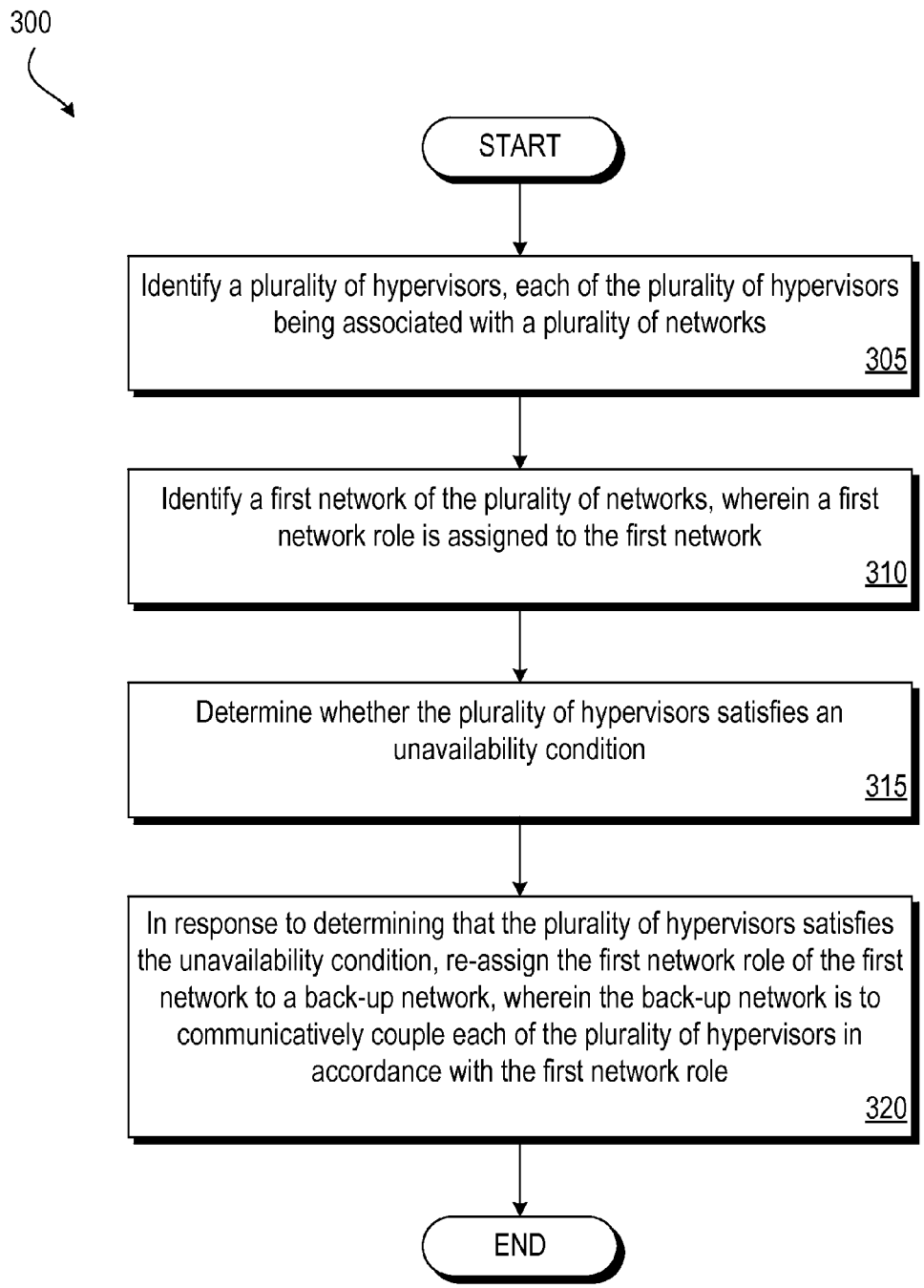
FIG. 3 is a flow diagram illustrating a method for managing network failure according to an embodiment of the disclosure.
Figure 4:
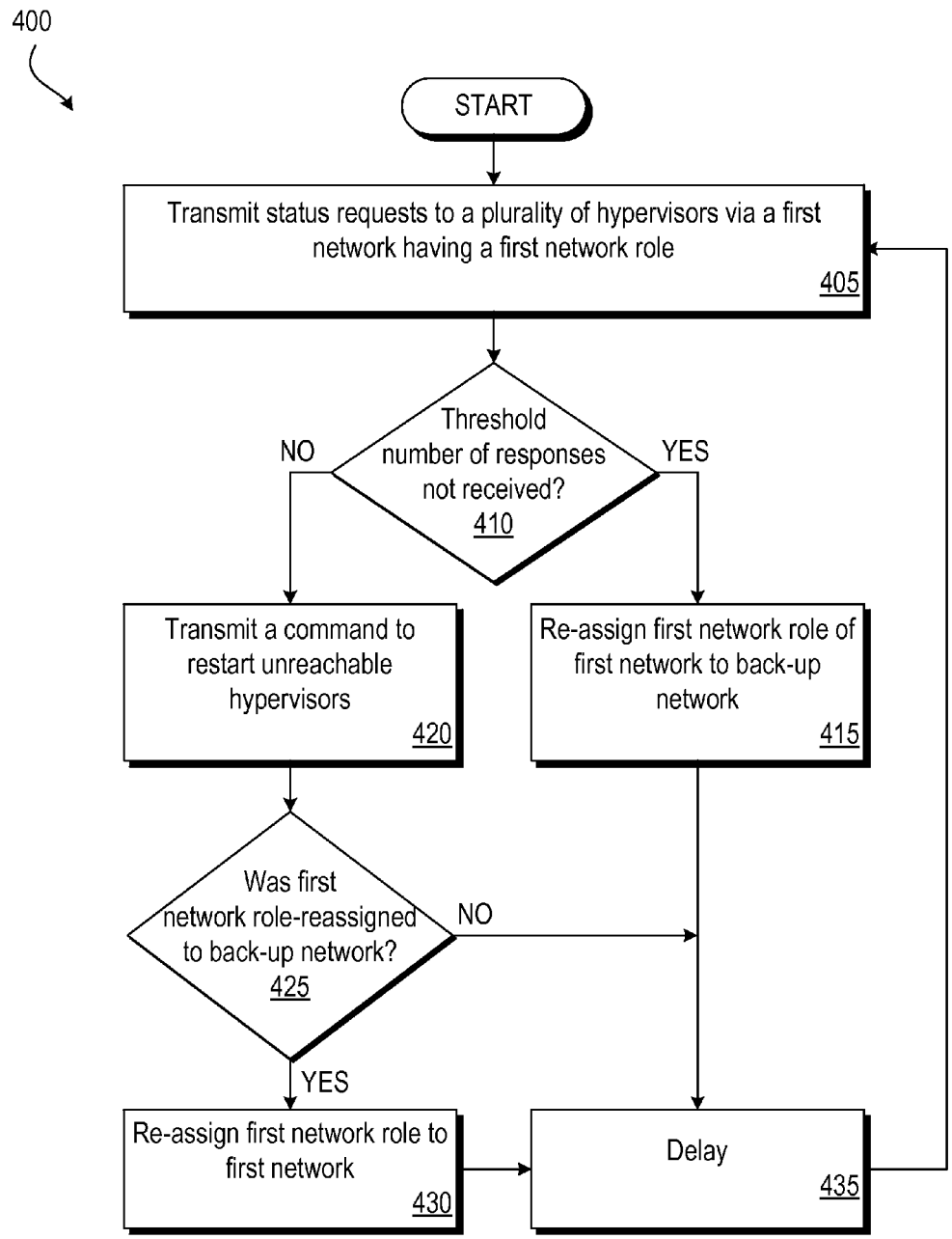
FIG. 4 is a flow diagram illustrating a method for re-assignment of network roles according to an embodiment of the disclosure.

FIG. 3 is a flow diagram illustrating a method 300 for managing network failure according to an embodiment of the disclosure. FIG. 4 is a flow diagram illustrating a method 400 for re-assignment of network roles according to an embodiment of the disclosure. Methods 300 and 400 may be performed by processing logic that may include hardware (e.g., processing devices, circuitry, dedicated logic, programmable logic, microcode, etc.), software (such as instructions run on a processing device), firmware, or a combination thereof. In some embodiments, the methods 300 and 400 are performed by a processing device implementing the monitoring component 122 described with respect to FIG. 1. In some embodiments, the methods 300 and 400 are performed by the management server 120, or any other device of the system architecture 100 that implements a monitoring component (e.g., host system 130A may be adapted to implement some or all of the functionality of the monitoring component 122).

Referring now to FIG. 3, the method 300 begins at block 305 where a processing device identifies a plurality of hypervisors (e.g., the hypervisors 131A-131Z), with each of the hypervisors being associated with a plurality of networks (e.g., the networks 110A-110Z). At block 310, the processing device identifies a first network of the plurality of networks, in which a first network role is assigned to the first network. In some embodiments, the network role is a management network role, a migration network role, a display network role, or a storage network role. In some embodiments, other network roles may be utilized. In some embodiments, the first network role was assigned by an administrator (e.g., using the network management window 252).

At block 315, the processing device determines whether the plurality of hypervisors satisfies an unavailability condition. The unavailability condition of the plurality of hypervisors may take into account one of the plurality of hypervisors (e.g., failure/unreliability of a single hypervisor), a subset of the plurality of hypervisors, or all of the plurality of hypervisors.

In one embodiment, the unavailability condition is a condition that a threshold number of hypervisors are unreachable via the first network (e.g., unreachable by the management server 120). For example, the processing device may transmit messages (e.g., status requests) to multiple hypervisors via the first network requesting a status indication from each hypervisor. If a threshold number of status indications are not received by the processing device, the processing device may determine that the first network is unavailable (e.g., has failed). For example, this may serve as an indicator as to the unavailability of the network itself rather than individual hypervisors. In some embodiments, the threshold number may be two, three, four, five, six, or more hypervisors depending on the size of the network.

In one embodiment, the unavailability condition is a condition that a first hypervisor of the plurality of hypervisors is reachable via the back-up network and is unreachable via the first network. For example, the processing device may transmit a message (e.g., a status request) to the hypervisor via the first network requesting a status indication from the first hypervisor or one of the virtual machines of the hypervisor (e.g., one of the virtual machines 132A of the hypervisor 131A). If a status indication is not received by the processing device, the processing device may attempt to reach the first hypervisor via a second network (e.g., the back-up network) in a similar manner. If a status indication is received from the first hypervisor via the second network, then the processing device may determine that the first network has failed.

In one embodiment, the unavailability condition is a condition that the first hypervisor has been unreachable via the first network for a pre-defined period of time. For example, the processing device may fail to communicate with a first hypervisor, and then wait for pre-determined period of time before attempting to reach the first hypervisor again. If the processing device is still unable to reach the first hypervisor, the processing device may determine that the first network has failed. In some embodiments, the processing device may determine that a threshold number of hypervisors are unreachable, and then attempt to reach the unreachable hypervisors again after the pre-determined time. If the hypervisors are still unreachable, then the processing device may determine that the first network has failed. In some embodiments, the pre-defined period of time is one minute, two minutes, five minutes, ten minutes, or longer.

In one embodiment, the unavailability condition is a condition that an availability of the first hypervisor via the first network has been unreachable a pre-defined number of times during a pre-defined period of time. For example, the processing device may periodically or aperiodically attempt to reach a first hypervisor (or a plurality of hypervisors) during the pre-defined period of time. If the first hypervisor (or a threshold number of the plurality of hypervisors) are unreachable a pre-defined number of times during the pre-defined period of time (e.g., 4 times within 5 minutes), this may indicate that the first network is unstable. Accordingly, the processing device may determine that the first network has failed or is unreliable (prone to failure). In some embodiments, the pre-defined period of time is one minute, two minutes, five minutes, ten minutes, or longer. In some embodiments, the pre-defined number of times is one time, two times, three times, four times, five times, or more.

At block 320, the processing device (in response to determining that the plurality of hypervisors satisfies the unavailability condition) re-assigns the first network role of the first network to a back-up network. The back-up network is to then communicatively couple each of the plurality of hypervisors in accordance with the first network role. The term "communicative coupling of hypervisors", or variants thereof, is understood to imply establishing communication between one or more of the host machines of hypervisors, the hypervisors themselves, one or more of the virtual machines of the hypervisors, and one or more hypervisors with any other device (e.g., within the system architecture 100).

In one embodiment, the back-up network is identified by the processing device. For example, the back-up network may have been designated by a network administrator (e.g., by receiving a user selection of the back-up network using the GUI 150), designated automatically by the processing device, or designated by another suitable manner. In one embodiment, the processing device identifies the back-up network by identifying one of the plurality of networks that has a lease amount of demand by the plurality of hypervisors. For example, a migration network may have less demand (e.g., as a result of performing occasional migrations of virtual machines between different hypervisors/host machines) than a management network that constantly communications with multiple hypervisors/host machines.

In one embodiment, the back-up network may be a second network of the plurality of networks. The back-up network (or second network) may perform the first network role that was originally assigned to the first network. For example, if the first network role is a network manager role, the back-up network is assigned the role of network manager in lieu of the first network (which was determined by the processing device to have failed, in view of the unavailability condition). In one embodiment, the back-up network may have been non-operational until it was assigned the first network role. In one embodiment, the back-up network may have had a second network role prior to being assigned the first network role (e.g., the back-up network may have been a migration network). In one embodiment, the back-up network simultaneously performs the first network role and the second network role by communicatively coupling each of the plurality of hypervisors in accordance with the first and second network roles (e.g., the back-up network may function as both a management network and a migration network).

In some embodiments, the back-up network may be assigned to perform multiple-network roles (e.g., if multiple networks fail). In one embodiment, one or more of the network roles (either assigned to the back-up network or any other networks of the plurality of networks) may communicatively couple a subset of the plurality of hypervisors. For example, the first network role may only serve to communicatively couple a subset of the plurality of hypervisors, and the second network role may only serve to communicatively couple a second subset of the plurality of hypervisors, and the first and second subsets may be overlap or be mutually exclusive in some embodiments.

In one embodiment, the processing device may transmit (in response to determining that the plurality of hypervisors fails to satisfy the unavailability condition) a command via the back-up network to restart one or more hypervisors of the plurality of hypervisors (or virtual machines) that are unreachable via the first network.

Referring now to FIG. 4, the method 400 begins at block 405 where a processing device transmits status requests to a plurality of hypervisors via a first network having a first network role. At block 410, the processing device determines if a threshold number of responses were not received. If the threshold number of responses were not received (e.g., ten requests were sent and four responses were received, with the threshold number of responses being three), then the method 400 proceeds to block 415, where the processing device re-assigns the first network role of the first network to a back-up network. Blocks 405, 410, and 415 may be performed in a substantially similar fashion as described above with respect to blocks 315 and 320 of FIG. 3. After block 415, the method 400 proceeds to block 435 where the processing device is delayed for a period of time. After the delay, the method 400 proceeds to block 405 in which the availability of the first network is evaluated again. If at block 410, if the threshold number of responses is still not received, the controller may bypass block 415 (e.g., if the first network role has already previously been re-assigned to the back-up network).

In some embodiments, the processing device may determine, using any suitable method, whether the back-up network is unavailable. In response to determining that the back-up network is or has become unavailable, the processing device may assign the first network role to another back-up network (that serves as a back-up network to the back-up network).

At block 410, if the controller determines that the threshold number of responses have not been received (e.g., ten requests were sent and two responses were received, with the threshold number of responses being three), then the method 400 proceeds to block 420, where the processing device transmits a command to restart the unreachable hypervisors (e.g., via the first network, the back-up network, or any other suitable network). Hypervisors need not be restarted in many cases, and the suitable time for restarting a hypervisor would be appreciated by one of ordinary skill in the art. Accordingly, in some embodiments, block 420 may be omitted from the method 400.

At block 425, the processing device determines whether the first network role was re-assigned to the back-up network. If the first network role was re-assigned to the back-up network (e.g., as a result block 415), then the method 400 proceeds to block 430 where the processing device re-assigns the first network role back to the first network (e.g., the first network is available once again). The method 400 may repeat continuously to maintain network functionality.

For simplicity of explanation, the methods of this disclosure are depicted and described as a series of acts. However, acts in accordance with this disclosure can occur in various orders, concurrently, and/or with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture, such as a computer-readable device or storage media, to facilitate transporting and transferring such methods to computing devices. Accordingly, the term "article of manufacture", as used herein, is intended to include a computer program accessible from any computer-readable device or storage media.

Figure 5:
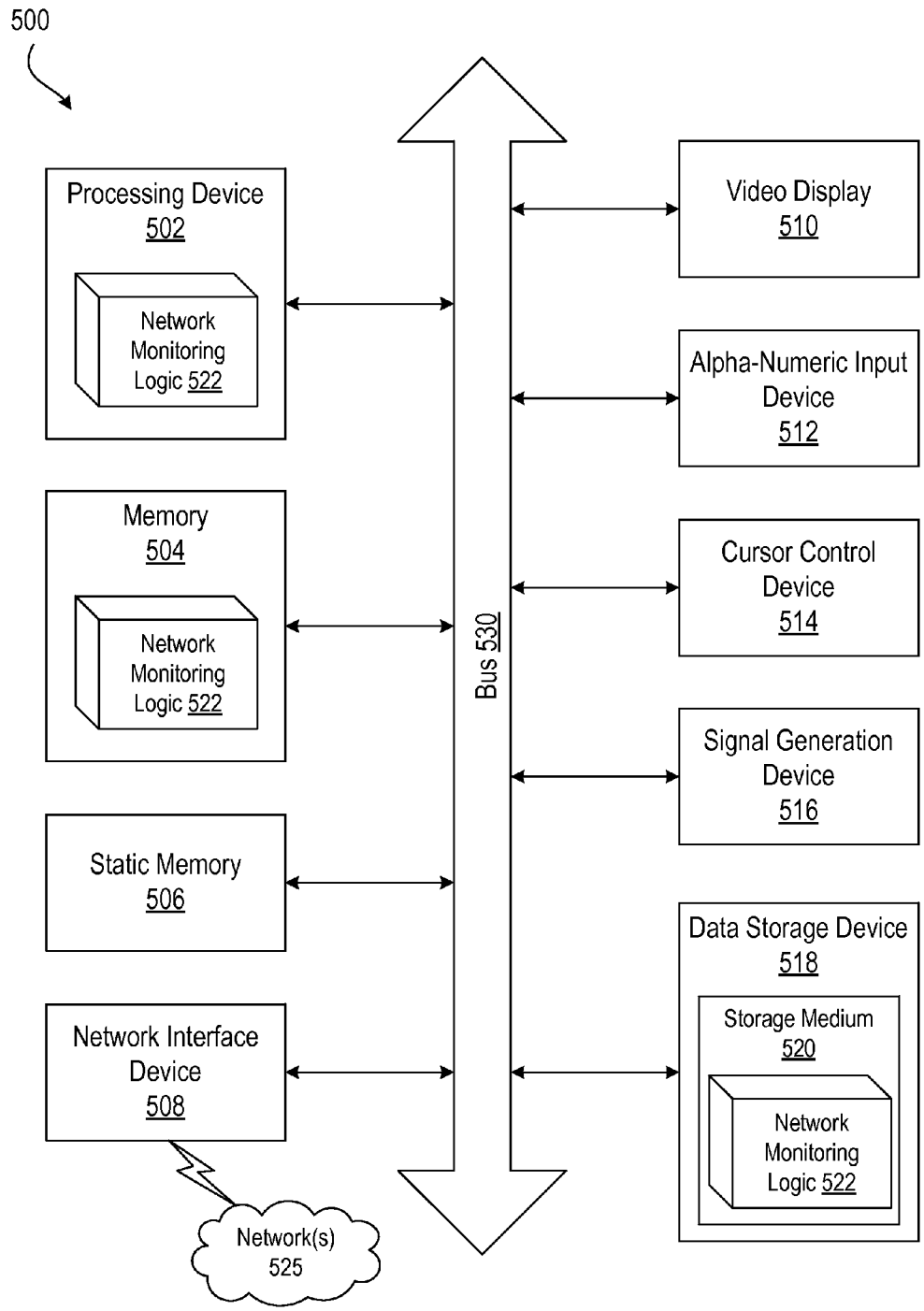
FIG. 5 illustrates a block diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, the Internet, or combinations thereof. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute network monitoring logic 522 for performing the operations and steps discussed herein. In one embodiment, the monitoring component 122, described with respect to FIG. 1, performs the network monitoring logic 522. In one embodiment, the computer system 500 corresponds to the management server 120. The management server 120, one more of the host systems 130A-130Z, and/or one or more of the storage servers 140A-140Z may include some or all of the functionality of the computer system 500.

The computer system 500 may further include a network interface device 508. The computer system 500 may also include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium (or more specifically a computer-readable storage medium) 520 on which is stored one or more sets of instructions (e.g., the network monitoring logic 522) embodying any one or more of the methodologies of functions described herein. The network monitoring logic 522 may also reside, completely or at least partially, within the memory 504 (and/or the memory 506) and/or within the processing device 502 during execution thereof by the computer system 500, with the memory 504 and the processing device 502 constituting machine-accessible storage media. In one embodiment, the network monitoring logic 522 provides the same functionality as the monitoring component 122 described with respect to FIG. 1.

The machine-readable storage medium 520 may also be used to store the network monitoring logic 522 persistently containing methods that call the above applications. While the computer-readable storage medium 520 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media. The term "machine-accessible storage medium" shall also be taken to including machine-readable or computer-readable storage media (e.g., non-transitory computer-readable storage media).

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions, which follow, are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the preceding discussion, it is appreciated that throughout the description, discussions utilizing terms such as "receiving", "storing", "identifying", "computing", "causing", "enabling", "disabling", "updating", "setting", "comparing", "generating", "preventing", "notifying", "modifying", "rendering", "displaying", "assigning", "un-assigning", "re-assigning", "designating", or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may include a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation. Moreover, it is noted that the "A-Z" notation used in reference to certain elements of the drawings is not intended to be limiting to a particular number of elements. Thus, "A-Z" is to be construed as having one or more of the element present in a particular implementation.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   identifying a plurality of hypervisors, each of the plurality of hypervisors being associated with a plurality of networks;
   identifying a first network of the plurality of networks, wherein a first network role is assigned to the first network;
   determining, by a processing device, whether the plurality of hypervisors satisfies an unavailability condition; and
   in response to determining that the plurality of hypervisors satisfies the unavailability condition, re-assigning the first network role of the first network to a back-up network, wherein the back-up network is to communicatively couple each of the plurality of hypervisors in accordance with the first network role.

2. The method of claim 1, wherein the unavailability condition comprises one or more of:
   a threshold number of hypervisors are unreachable via the first network,
   a first hypervisor of the plurality of hypervisors is reachable via the back-up network and is unreachable via the first network,
   the first hypervisor has been unreachable via the first network for a first pre-defined period of time, or
   an availability of the first hypervisor via the first network has been unreachable a pre-defined number of times during a second pre-defined period of time.

3. The method of claim 1, further comprising:
   in response to determining that the plurality of hypervisors fails to satisfy the unavailability condition, transmitting a command via the first network or the back-up network to restart one or more hypervisors of the plurality of hypervisors that are unreachable via the first network.

4. The method of claim 1, further comprising:
   identifying, by the processing device, the back-up network, wherein identifying the back-up network comprises receiving a user selection of the back-up network.

5. The method of claim 1, further comprising:
   identifying, by the processing device, the back-up network, wherein identifying the back-up network comprises determining a network in the plurality of networks that has a least amount of demand by the plurality of hypervisors.

6. The method of claim 1, wherein the back-up network previously assigned a second network role.

7. The method of claim 6, wherein the back-up network is to communicatively couple each of the plurality of hypervisors in accordance with the first network role and the second network role.

8. The method of claim 1, wherein the first network role is selected from a group consisting of a management network role, a migration network role, a display network role, and a storage network role.

9. A system comprising:
   a memory; and
   a processing device communicatively coupled to the memory, wherein the processing device is to:
   transmit a first plurality of status requests to each of plurality of hypervisors via a first network, the first network being associated with a back-up network and a first network role;
   determine whether the processing device failed to receive a threshold number of responses from the plurality of hypervisors;
   in response to determining that the processing device failed to receive the threshold number of responses, assign the first network role to the back-up network if the first network role was previously assigned to the first network; and
   in response to determining that the processing device successfully received the threshold number of responses, assign the first network role to the first network if the first network role was previously assigned to the back-up network.

10. The system of claim 9, wherein the processing device is further to:
    in response to determining that the processing device failed to receive the threshold number of responses, cause the first network role remain assigned to the back-up network if the first network role was previously assigned to the back-up network; and
    transmit a second plurality of status requests to each of plurality of hypervisors via the first network after a pre-defined period of time.

11. The system of claim 9, wherein the processing device is further to:
    in response to determining that the processing device successfully received the threshold number of responses, transmit a command via the first network or the back-up network to restart one or more hypervisors of the plurality of hypervisors that are unreachable via the first network.

12. The system of claim 9, wherein the processing device is further to:
    identify the back-up network by receiving a user selection of the back-up network.

13. The system of claim 9, wherein the processing device is further to:

identify the back-up network by determining a network in a plurality of networks that has a least amount of demand by the plurality of hypervisors.

14. The system of claim 9, wherein the back-up network was previously assigned a second network role, and wherein the back-up network is to communicatively couple each of the plurality of hypervisors in accordance with the first network role and the second network role.

15. The system of claim 9, wherein the first network role is selected from a group consisting of a management network role, a migration network role, a display network role, and a storage network role.

16. A non-transitory computer-readable storage medium including instructions that, when executed by a processing device, cause the processing device to:
   identify a plurality of hypervisors, each of the plurality of hypervisors being associated with a plurality of networks;
   identify a first network of the plurality of networks, wherein a first network role is assigned to the first network;
   determine whether the plurality of hypervisors satisfies an unavailability condition; and
   re-assign the first network role of the first network to a back-up network in response to determining that the plurality of hypervisors satisfies the unavailability condition, wherein the back-up network is to communicatively couple each of the plurality of hypervisors in accordance with the first network role.

17. The non-transitory computer-readable storage medium of claim 16, wherein the unavailability condition comprises one or more of:
   a threshold number of hypervisors are unreachable via the first network,
   a first hypervisor of the plurality of hypervisors is reachable via the back-up network and is unreachable via the first network,
   the first hypervisor has been unreachable via the first network for a first pre-defined period of time, or
   an availability of the first hypervisor via the first network has been unreachable a pre-defined number of times during a second pre-defined period of time.

18. The non-transitory computer-readable storage medium of claim 17, wherein the instructions further cause the processing device to:
   transmit, in response to determining that the plurality of hypervisors fails to satisfy the unavailability condition, a command via the first network or the back-up network to restart one or more hypervisors of the plurality of hypervisors that are unreachable via the first network.

19. The non-transitory computer-readable storage medium of claim 17, wherein the instructions further cause the processing device to:
   identify the back-up network by receiving a user selection of the back-up network; or
   identify the back-up network by determining a network in the plurality of networks that has a least amount of demand by the plurality of hypervisors.

20. The non-transitory computer-readable storage medium of claim 17, wherein the back-up network previously assigned a second network role, wherein the back-up network is to communicatively couple each of the plurality of hypervisors in accordance with the first network role and the second network role, and wherein the first network role and the second network role are each selected from a group consisting of a management network role, a migration network role, a display network role, and a storage network role.

* * * * *